United States Patent [19]

Mihara et al.

[11] Patent Number: 4,875,533
[45] Date of Patent: Oct. 24, 1989

[54] AUTOMATIC WEIGHT DETECTING DEVICE

[75] Inventors: Makoto Mihara, Nara; Masanobu Inoue, Yamatokoriyama; Kenzo Ohji, Ikoma; Shuji Itou, Shiki, all of Japan

[73] Assignee: Matsushita Electric Industrial Co., Ltd., Osaka, Japan

[21] Appl. No.: 216,497

[22] Filed: Jul. 8, 1988

[30] Foreign Application Priority Data

Jul. 13, 1987 [JP] Japan .................... 62-174097
Jul. 13, 1987 [JP] Japan .................... 62-174098

[51] Int. Cl.⁴ .................... G01G 19/52; G01G 3/14
[52] U.S. Cl. .................... 177/144; 177/210 C; 177/245
[58] Field of Search .................... 177/210 C, 245, 144

[56] References Cited

U.S. PATENT DOCUMENTS 4,615,405 10/1986 Morino et al. .................... 177/245 X
4,673,800 6/1987 Hirai et al. .................... 177/245 X
4,676,328 6/1987 Morino .................... 177/245 X

FOREIGN PATENT DOCUMENTS

WO87/04786 8/1987 Japan .

Primary Examiner—George H. Miller, Jr.
Attorney, Agent, or Firm—Wenderoth, Lind & Ponack

[57] ABSTRACT

An automatic weight detecting device is provided with a platform on which an object to be measured is placed, a supporting shaft for supporting the platform is rotatable and smoothly movable in the supporting direction. A driving motor rotates the supporting shaft, and an elastic member supports the supporting shaft. A load detecting device converts the load of the object, transmitted in the supporting direction of the rotatable supporting shaft through the elastic member into a given electrically physical amount and a weight detecting circuit integrates to obtain the average of the electrically physical amount while the shaft rotates, so that the weight of the object is detected.

12 Claims, 11 Drawing Sheets

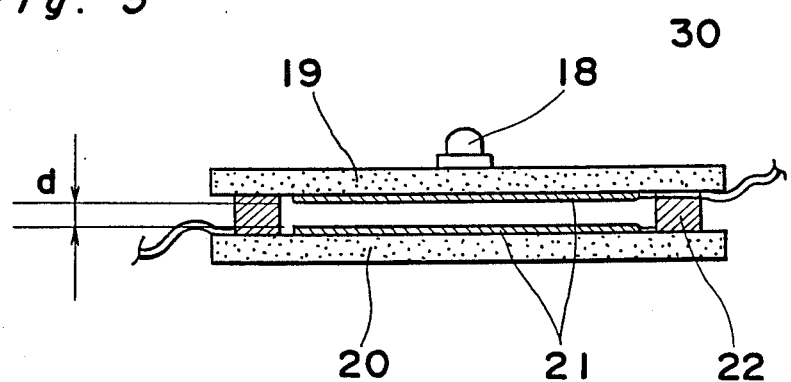
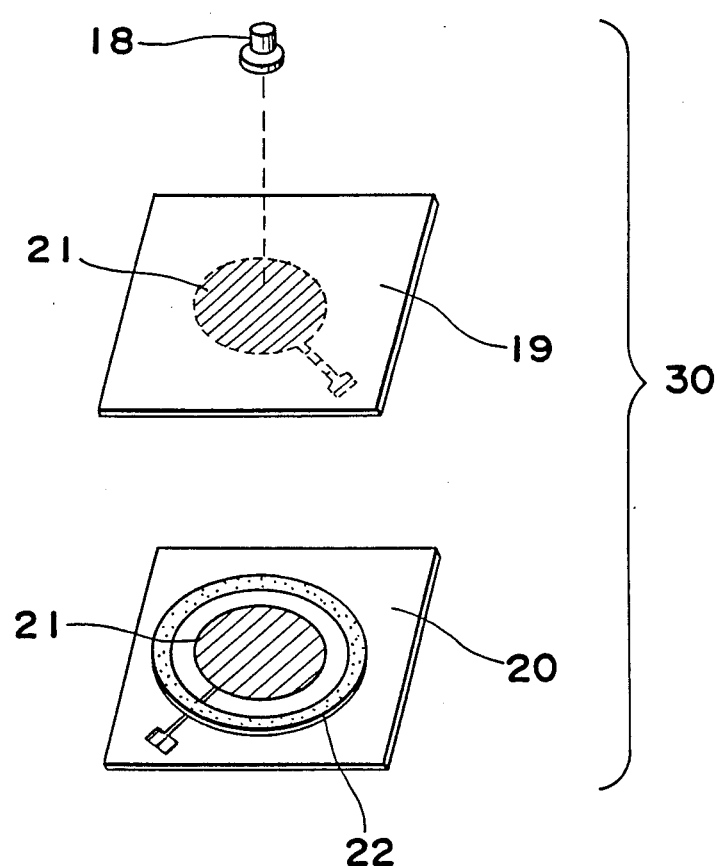

Fig. 14
(a)
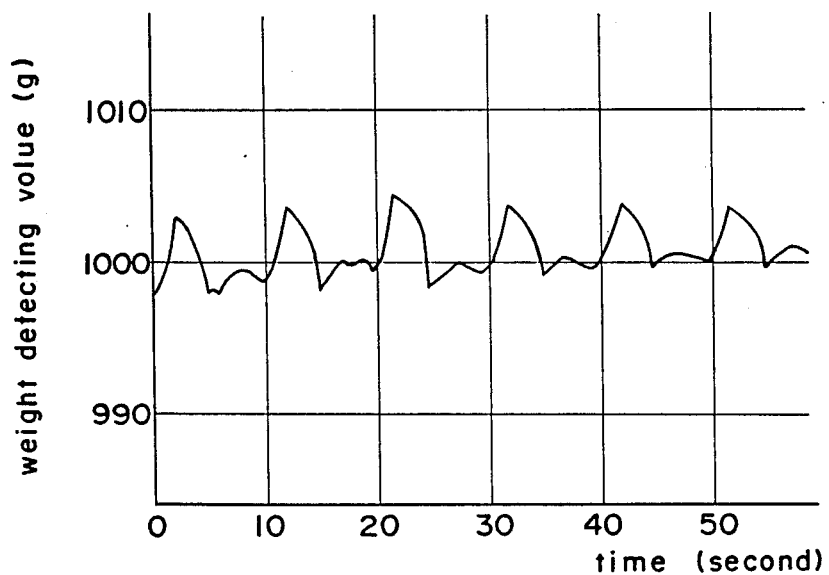
(b)
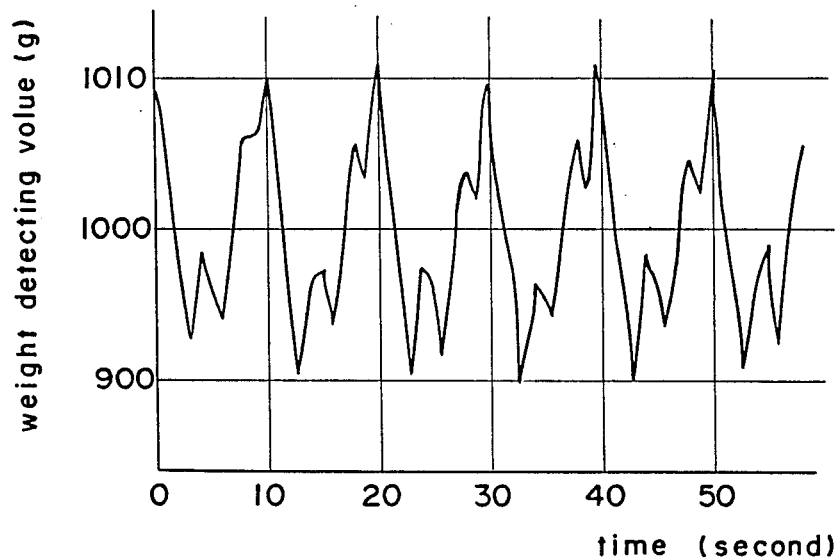

AUTOMATIC WEIGHT DETECTING DEVICE

BACKGROUND OF THE INVENTION

The present invention relates to a weight detecting device which is mounted in an automatic heating and cooking apparatus such as an electronic oven, etc. for use in detecting the weight of a food to be heated or cooked.

The weight of a food is an extremely important and useful factor for cooking, together with vapor and/or gas generated from the food, when the automization of cooking is going to be realized. Particularly, in the technical field of the electronic oven, the automization of cooking has been established through detection of the weight of the food by the use of a weight sensor, and this technique of the automatic cooking has been already practiced, for example, when automatically defrosting frozen foods.

Meanwhile, the weighing errors due to the difference in the position where the food or the like to be measured is placed are a common problem in any weight detecting devices including the weight sensor of the electronic oven. For avoiding such influences by the weighing errors as above, therefore, for example, the weight sensor of the electronic oven disclosed in international publication WO 87/04786 (SAKAMOTO et al.) employs a weighing system called Roberval's system which works to transmit the load of an object to be measured correctly to a weight detecting means wherever the objects is placed on a weighing platform in the sensor. As shown in FIG. 6, the load of the object is effectively transmitted in a thrust direction with respect to a shaft 22. Therefore, it is not necessary for a user of the weight sensor to place the object in a designated position on the platform, but the correct weight of the object can be detected whenever the object is placed on the platform.

The Roberval's mechanism although it is remarkably useful in practical use as described above, is generally complicated and bulky structure, as seen from FIG. 6. Moreover, from the characteristic viewpoint, since the system's efficiencies will be effectively brought out as the space in the thickness direction is increased, the system is inevitably large in size. Thus, the presence of the Roberval's mechanism in the weight sensor is contradictory in itself to the improvement of efficiencies, resulting in an obstacle to designing a space-saving, thinner weight sensor.

SUMMARY OF THE INVENTION

An essential object of the present invention is to provide a weight detecting device which is provided with a compact and thin weight arrangement in a simplified structure of a Roberval's mechanism, which is highly reliable while securing the same weighing accuracy and sturdiness.

In accomplishing the above-described object, according to the present invention, the weight detecting device is provided with a platform on which an object to be measured is placed, a supporting shaft for supporting the platform and which is rotatable and smoothly movable in the supporting direction, a driving for rotating the supporting shaft, an elastic member for supporting the supporting shaft, a load detecting device which converts the load of the object to be transmitted in the supporting direction of the rotatable supporting shaft through the elastic member an electrical signal of a given electrically physical amount, and a weight detecting circuit which integrates to obtain the average of the electrically physical amount while rotating, so that the weight of the object is detected. In the above-described construction, the load of the object to be measured is transmitted to the load detecting device without direct contact to the latter, although some stress loss is caused by the elastic member. Therefore, there is no such problem at all that the supporting shaft which is always rotated is brought into contact with the load detecting device to be worn off, so that the durability of the weight detecting device is greatly improved. Furthermore, in the present invention, the above-described load detecting device is a compact and thin electrostatic capacity type which is comprised of a pressure sensitive sensor formed in the manner that two diaphragms made of sintered alumina are bonded to each other to make a several tens microns' minute gap therebetween, with electrodes provided on each opposite surface, and a load transmission member which, upon receipt of the load, comes in contact with the sensitive sensor at a predetermined area to apply pressure, thus bringing about a much thinner weight detecting device. At the same time, if the most adequate shape is selected for each of the load transmission member and the supporting shaft, the weighing errors due to the difference in the placement position of the object (positional errors) can be reduced.

In addition to the above, a very small gap is formed between the load detecting device and the platform of the load detecting means in the weight detecting device of the present invention, and therefore the load detecting devices can be prevented from being added pressure from the side of the platform, thereby improving the measuring accuracy. Simultaneously, it can be avoided that the diaphragms are excessively deflected and broken because of an overload or an impact application.

BRIEF DESCRIPTION OF THE DRAWINGS

These and other objects and features of the present invention will become clear from the following description taken in conjunction with the preferred embodiments thereof with reference to the accompanying drawings, in which:

FIG. 5 is an exploded view of an electrostatic capacity type load sensor installed in the weight detecting device of FIG. 3;

FIG. 6 is a cross sectional view of the electrostatic capacity type load sensor of FIG. 5;

FIGS. 14(a) and 14(b) are waveforms of the instantaneous weight showing the effects of the weight detecting device of FIG. 13;

DETAILED DESCRIPTION OF THE INVENTION

Figure 1:
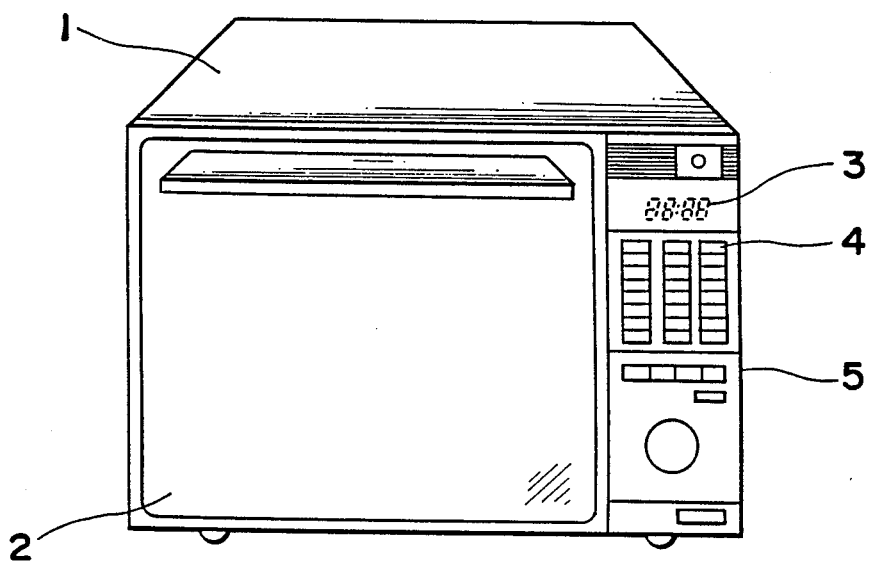
FIG. 1 is a perspective view of a main body of an electronic oven in which a weight detecting device according to one preferred embodiment of the present invention is mounted.

Before the description of the present invention proceeds, it is to be noted that like parts are designated by like reference numerals throughout the accompanying drawings.

In FIG. 1, there is shown a perspective view of a main body of a heating and cooking apparatus provided with a weight detecting device according to the present invention. At the front face of a main body 1 of the heating and cooking apparatus, a door member 2 is supported by a shaft to be freely openable and closable so as to place food into the main body. A key input part 4 and a display tube 3 are provided on an operating panel 5. The selection of the category of cooking, inputting of the cooking time, ordering start or stop of cooking, etc. are performed through the key input part 4, and a user watches the operating condition or interacts with the heating apparatus through the display tube 3.

Figure 2:
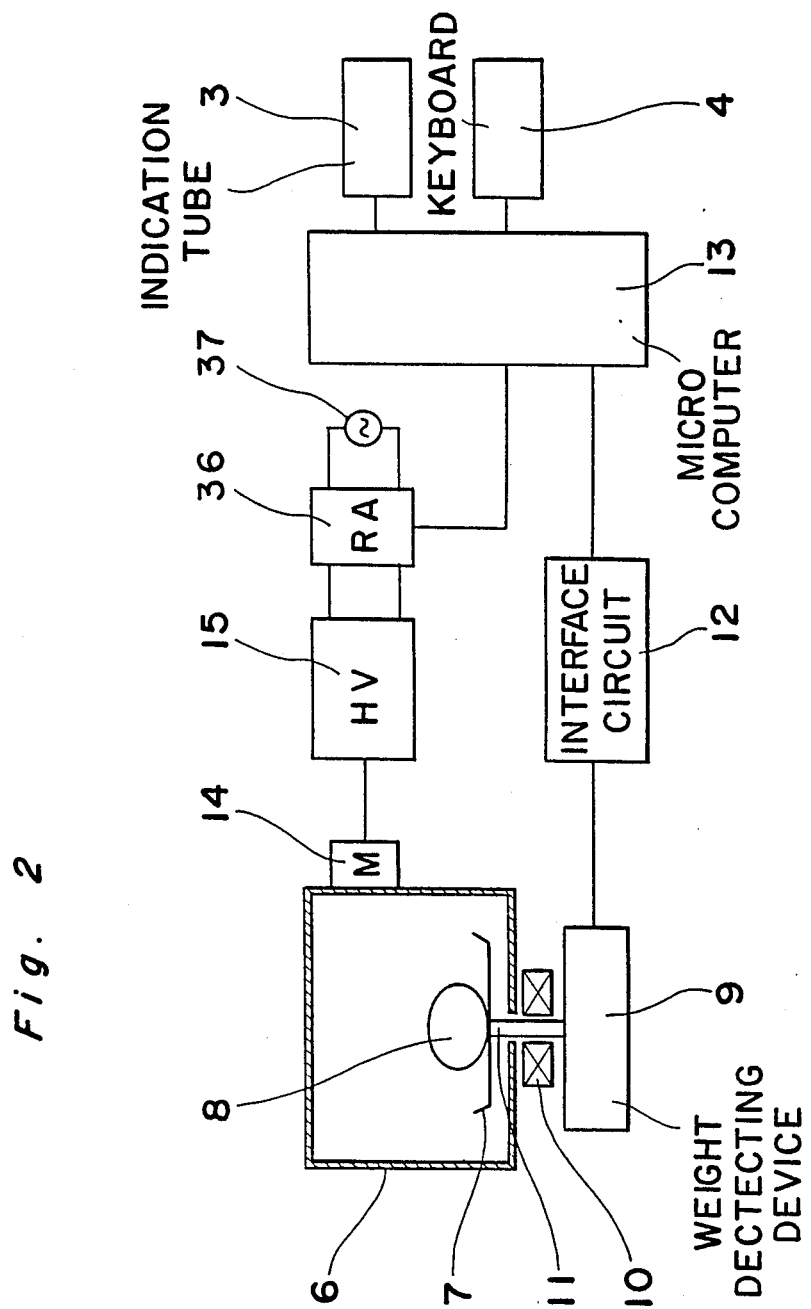
FIG. 2 is a block diagram showing the system of the electronic oven of FIG. 1.

FIG. 2 is a block diagram showing the structure of the heating and cooking apparatus of FIG. 1. A food 8 is accommodated in a heating chamber 6 within the main body 1, placed on a rotary saucer or plate 7 and rotated by a motor 10 so as to reduce uneven heating during cooking. A weight detecting device 9 is secured to the bottom portion of the heating chamber 6 and outputs an electrical signal of a given electrically physical amount upon receipt of the load of the food 8 through a supporting shaft 11 of the motor 10. An interface circuit 12 receives and converts the output of the weight detecting device 9 into a different form a signal which is easily detectable by the following device. A microcomputer 13 receives the output signal from the interface circuit 12 to calculate the weight of the food 8 and at the same time, controls the whole system. The heating and cooking apparatus further includes a magnetron 14 (M) for supplying high-frequency power to the food 8 in the heating chamber 6, a high voltage (HV) generating circuit 15 which converts low voltage of a commercial power supply into high voltage necessary for oscillation of the magnetron 14, and a relay actuator 36 (RA) which receives the signal from the microcomputer 13 to feed power of the commercial power supply 37 to the high voltage generating circuit 15 or stops the supply of power from the commercial power supply 37 to the high voltage generating circuit 15.

When the user selects the category of cooking through the keyboard 4 and orders starting of cooking, the microcomputer 13 detects the weight of the food 8. For example, in the case of automatic defrosting, the microcomputer 13 promptly calculates the necessary time for the food 8 to be automatically defrosted on the basis of the weight information, which time is indicated on the indication tube 3, so that the food is automatically completely processed in accordance with a predetermined cooking procedure. The weight detecting device is applied in the above-described manner in the electronic oven, thus contributing greatly to the automization of cooking.

Figure 3:
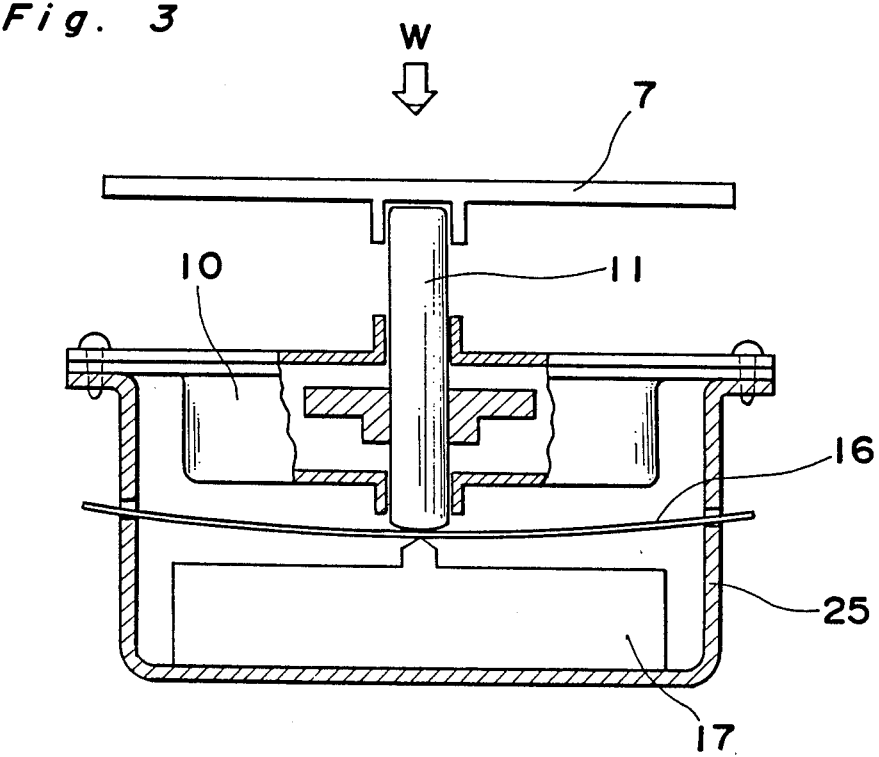
FIG. 3 is a cross sectional view of an essential part of the weight detecting device according to one preferred embodiment of the present invention.

However, the weight detecting device in the electronic oven is obliged to be mounted in the bottom portion of the heating chamber 6 because of its structure, thereby raising an accommodation space problem in the electronic oven. By way of example, one way to design an electronic oven is to have a large space allotted for the weight detecting device in the bottom portion of the heating chamber. However, if a generally accepted portion of parts of the electronic oven as shown in FIG. 1 is desired to be followed, the space allotted for the weight detecting device in the bottom portion of the heating chamber 6 might be too small, and therefore a thinner and more compact weight detecting device is required to be invented. It is needless to say that a weight detecting device having a thinner and more compact structure should not lose its efficiencies. FIG. 3 is a view showing the basic structure of a weight detecting device which meets the aforementioned requirement. The supporting shaft 11 of the weight detecting device passing through the motor 10 which rotates the rotary saucer 7 is held movable in the vertical direction. In the weight detecting device of FIG. 3, there are further provided an elastic member 16 consisting of a leaf spring, a load detecting device 17 for supporting the elastic member 16 and detecting the load transmitted in the thrust direction of the supporting shaft 11, and a metal fitting 25 onto which is placed the load detecting device 17.

Figure 4:
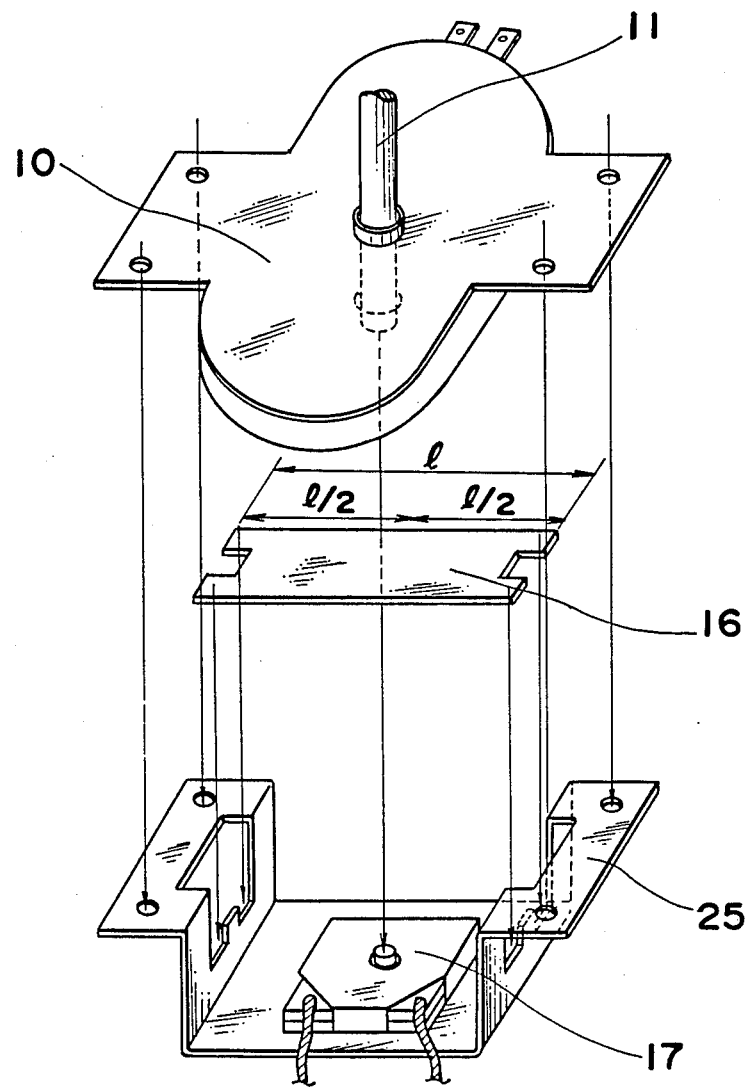
FIG. 4 is an exploded perspective view of the essential part of FIG. 3.

FIG. 4 is an exploded perspective view of an essential portion of the weight detecting device of the present invention. Both the motor 10 and the fixing metal fitting 25 are fixedly secured to the bottom portion of the heating chamber 6, directly or. The supporting shaft 11 passing through the motor 10 is smoothly moved in the thrust direction thereof. The structure of the motor 10 will be described in more detail later. The movement of the shaft 11 is, through the elastic member 16 which has opposite ends horizontally supported by the fixing metal fitting 25, transmitted to the load detecting device 17. Supposing that the distance between the opposite ends of the elastic member 16 is l, the elastic member 16 comes into contact with the supporting shaft 11 and the load detecting device 17 approximately at the center of the distance l. The position of half the distance l/2 is only one single position where the elastic member 16 presses the load detecting device 17 in the vertical direction due to the movement of the supporting shaft 11, so that the transmission loss is rendered minimal. Although some of the load is naturally lost as spring stress depending on the deflection amount of the elastic member 16 when the load is measured, such a problem can be solved by making the elastic constant of the elastic member 16 small enough that the sensitivity of the load detecting devices 17 is worsened. This will be explained in more detail later. Because of the presence of the elastic member 16, supporting shaft 11 is prevented from, while rotating, directly touching the load detecting device 17, consequently preventing wear out or break of the load detecting device 17 as a result of sliding therebetween. Moreover, since a leaf spring is employed for the elastic member 16, the space in the thickness direction is hardly changed. It is desirable, to endure a long term use, that lubricating oil is inserted in the portion where the elastic member 16 contacts the supporting shaft 11. Various kinds of sensors such as a deflection gauge type sensor, an electrostatic capacity type sensor, etc. are applicable for the above-described load detecting device 17.

Referring to FIGS. 5 and 6 showing an electrostatic capacity type load detecting device 30, the principle of the load detection will be described hereinbelow. A diaphragm 19 is made of a ceramic flat plate such as an alumina plate (each side having approximately 25 mm length) in the thickness of 0.5 mm. A substrate 20 is formed of the same material into the same shape as the diaphragm 19. Gold electrodes 21 and 21, each in a round shape having the thickness of 1 micron or so and a diameter of 20 mm, are printed and baked in the confronting surfaces of the diaphragm 19 and the substrate 20. Moreover, the substrate 20 and the diaphragm 19 are bonded with each other, with a small gap of about 45 mm therebetween formed by a glass spacer 22 which is concentrically spaced a predetermined distance in the circumference of electrodes 21. Supposing that the gap between the electrode 21 is d, the area of the electrodes is S, and the dielectric constant of the air which is a medium between the electrodes 21 is $\epsilon$, the electrostatic capacity C between the electrodes with no load is represented by:

$$C = \epsilon \frac{S}{d} \quad (1)$$

Figure 7:
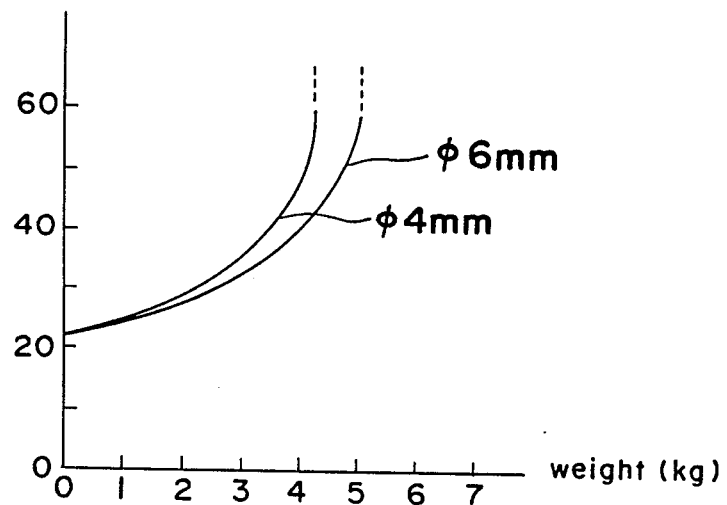
FIG. 7 is a graph showing the relation between the electrostatic capacity and the weight of the electrostatic capacity type load sensor of FIG. 5.

When a load transmission member 18 placed approximately in the center on the diaphragm 19 where the electrode is formed is loaded, the diaphragm 19 is deflected, thereby narrowing the gap of the electrodes 21. In other words, according to equation (1), the denominator d becomes smaller and the electrostatic capacity C becomes larger when the load is added. A general formula to obtain the electrostatic capacity C when the load is actually added is far more complicated than equation (1), and therefore is abbreviated here. Only the relation of the electrostatic capacity and the load is indicated in a graph of FIG. 7 in which the abscissa designates the weight of an object to be measured. The initial bias weight, for example, the weight of the rotary saucer, the supporting shaft and the like, is already added in the sensor in advance. The electrostatic capacity-load characteristic varies in accordance with the change in the contact area between the load transmission member 18 and the diaphragm 19, and the parameter is set to be the diameter of the contact area of the load transmission member 18. It is seen from the graph of FIG. 7 that the sensitivity in the case where the diameter of the contact area is 4 mm is better than that in the case where the diameter of the contact area is 6 mm. In other words, high sensitivity is gain when the contact area is rendered small. Thus, when 5 kg is added, the electrostatic capacity is increased up to 50-60 PF, although it is about 25 PF without any load.

The load sensor 30 of an electrostatic capacity type described above is compact and thin in structure, but displays a tremendously strong load-electrostatic capacity characteristic, and chemical stability without any change at all even after a long time has passed. Therefore, the electrostatic capacity type load sensor 30 is remarkably effective in practice use. However, since the load sensor 30 is inferior in mechanism strength, some protective countermeasures should be considered when mounting the load sensor into the weight detecting device.

Figure 8:
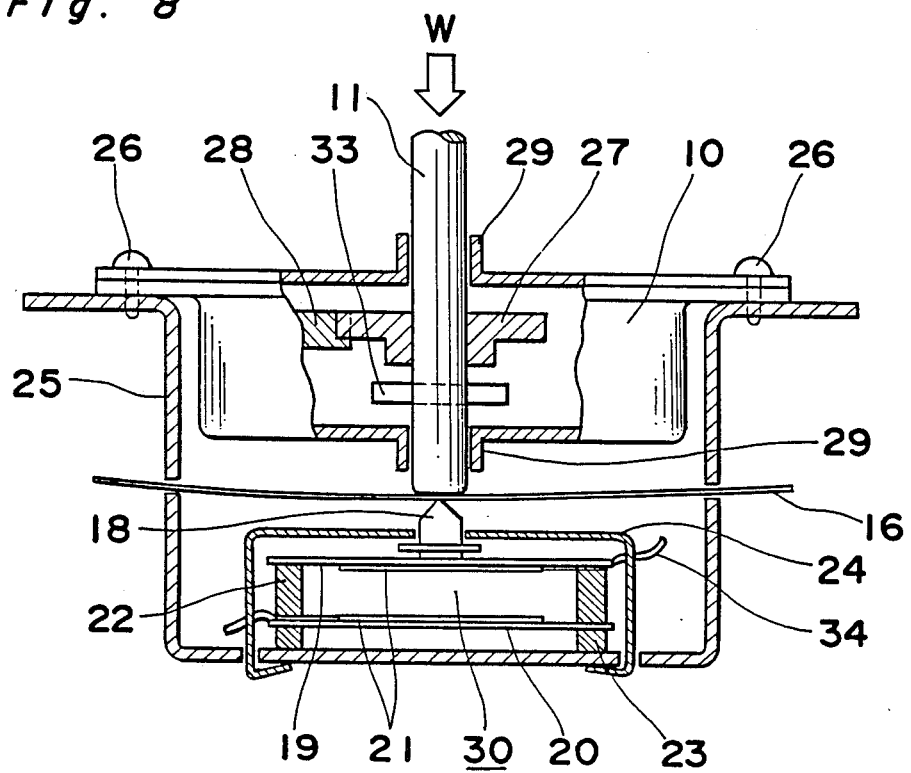
FIG. 8 is a cross sectional view of a weight detecting device provided with the electrostatic capacity type load sensor of FIG. 5.

FIG. 8 shows the structure of a weight detecting device which is provided with the electrostatic capacity type load sensor 30. The supporting shaft 11 passes through the interior of the motor 10. Moreover, the supporting shaft 11 is held by a bearing 29 in a manner to keep an adequate clearance. The material of the supporting shaft 11 is suitable to be ceramic in terms of abrasion-proof characteristic thereof. The motor 10 an electron source, synchronous model which has a permanent magnet and a coil as its driving source, and changes the rotation of the driving source from high speed into low speed and large torque by the use of many gears such as a gear 28 and a gear 27 secured to the supporting shaft 11. The supporting shaft 11 is formed with a through-hole into which is inserted a brake pin 33 to prevent the falling off of the shaft. It is also desirable that lubricating oil is filled in the clearance between the supporting shaft 11 and the bearing 29 so as to achieve smooth sliding.

The electrostatic capacity type load sensor 30 is placed on a sensor platform 23, and is entirely covered with a metallic sensor covering 24, so that the load sensor 30 is not only electrically shielded, but fixedly maintained. Further, a through-hole is formed in the sensor covering 24, through which the upper part of the load transmission member 18 projects outwards to be held movable in the vertical direction. The sensor platform 23 is sheet metal in a shape obtained when a portion at the sensitive part of the substrate 20 (inside the concentric glass spacer 22) is punched out, which prevents the load application from the lateral side of the substrate 20. In the above-described construction, the load W is transmitted correctly to the load transmission member 18 and the diaphragm 19 through the supporting shaft 11. At this point, the stress of the elastic member 16 should be taken into consideration. For example, when 1 kg load is added and the elastic member 16 is deflected 5 mm, the elastic constant K1 of the elastic member 16 is 0.2 (kg/mm). On the other hand, since it is a standard of the electrostatic capacity type load sensor 30 that the upper and lower electrodes 21 are brought into contact with each other when 6 kg load (including the initial bias weight) is added, the displacement amount is equal to the initial gap 0.045 mm of the electrodes, and therefore the elastic constant K2 is 133 (kg/mm).

As described above, K2 is 666 times as large as K1, and accordingly the load sensor 30 can neglect the influences of the elastic member 16. However, so long as the elastic member 16 is not broken due to the bending thereof, or the elastic member 16 is not pierced through because of the friction with the supporting shaft 11, the thickness of the elastic member 16 is better to be thinner to avoid influences of K1, thereby enhancing the sensitivity of the load sensor.

Figure 9:
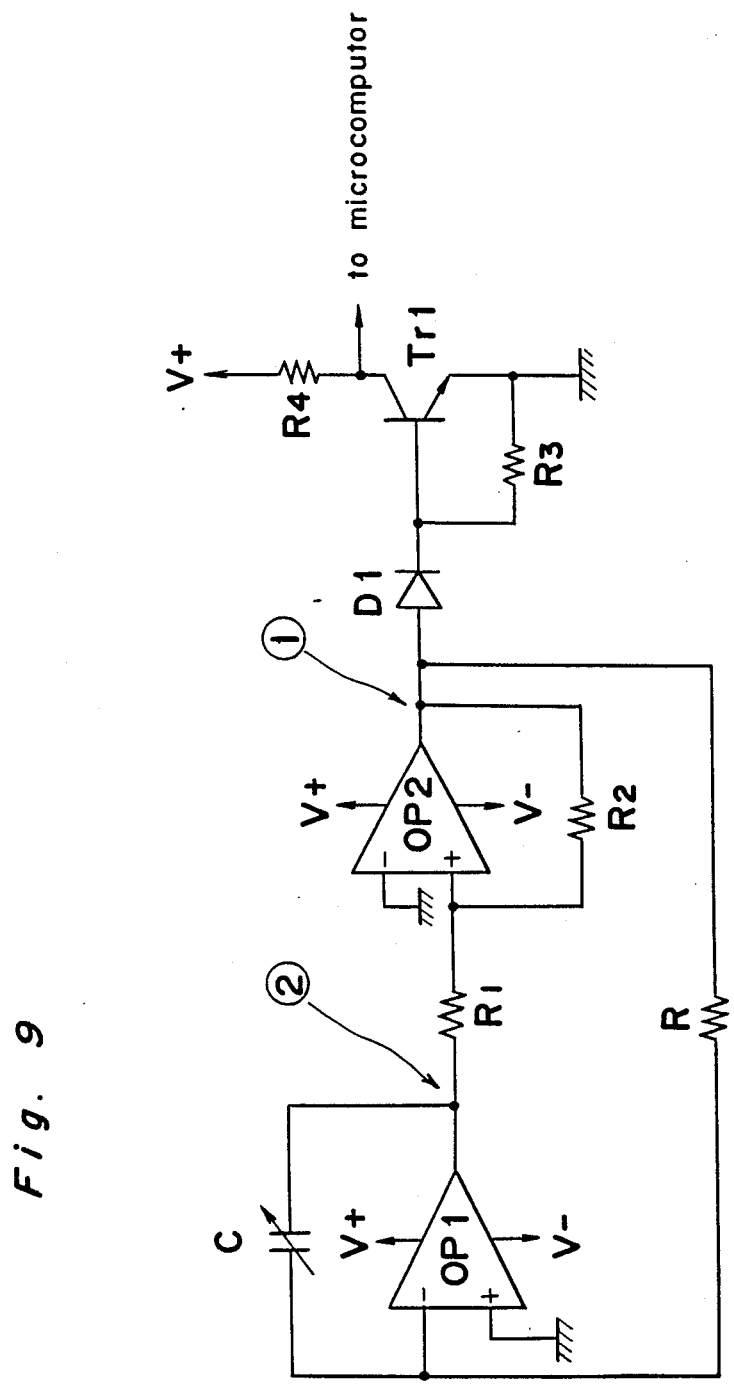
FIG. 9 is a circuit diagram of an interface circuit of the electrostatic capacity type load sensor of FIG. 5 and a microcomputer.
Figure 10A:
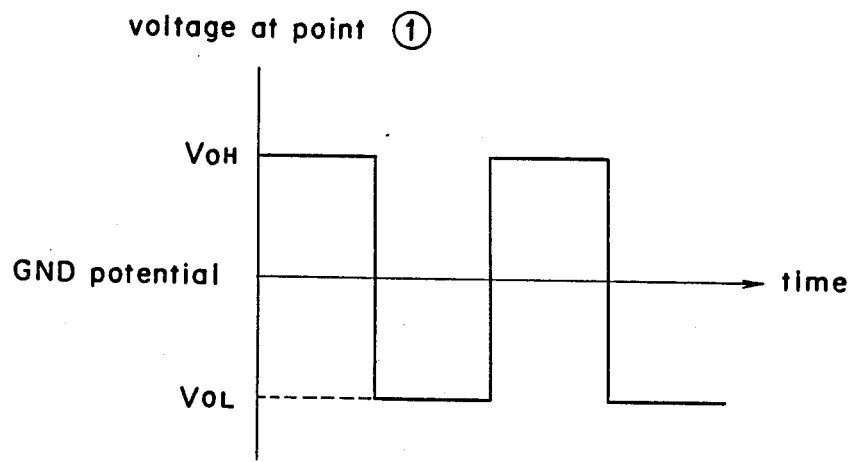
FIGS. 10(A) and (B) are signal waveforms in positions (1) and (2) of the interface circuit of FIG. 9.
Figure 10B:
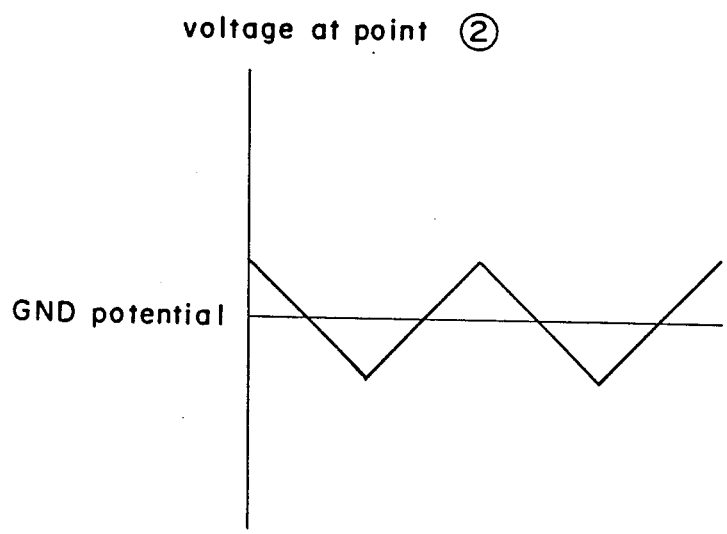
Figure 11:
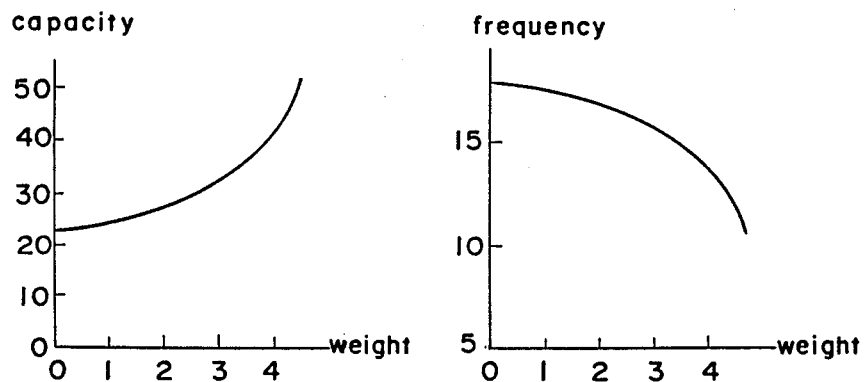
FIG. 11 are graphs respectively showing the load-electrostatic capacity characteristic of the electrostatic capacity type load sensor and the weight-electrostatic capacity characteristic of the interface circuit of FIG. 9.

Thereafter, the load transmitted to the electrostatic capacity type load sensor 30 is converted to an electrostatic capacity and taken outwards by a lead wire 34. However, since the microcomputer 13 can not recognize the electrically physical amount of the electrostatic capacity, the interface circuit 12 is required so that the electrostatic capacity is converted into a different form of information. The analog amount which the conventional microcomputer is able to recognize is generally and only the voltage level if the microcomputer is provided with an A/D conversion function. In accordance with the recent progress in the sensor technique, however, various kinds of microcomputers have been developed and, among those microcomputers, even such a one that can count the number of pulses inputted from an exterior circuit for a predetermined time independently of the operation of the CPU has been brought into the commercial market. Therefore, nowadays, several hundreds KHz of frequencies have come to be read directly by such microcomputer as above with extreme ease. Accordingly, in the present invention, such microcomputer as described above which is equipped with the event counter function is employed, together with an oscillating circuit as the interface circuit 12 wherein the frequency is changed depending on the electrostatic capacity. FIG. 9 is a circuit diagram of the interface circuit 12. Operational amplifiers OP1 and OP2 are operated by three power sources, namely, V+, V− and GND. An integrated circuit comprised of the operational amplifier OP1, a resistance R and the electrostatic capacity C of the electrostatic capacity type load sensor 30 and a hysteresis comparator comprised of the operational amplifier OP2, and resistances R1 and R2 are combined to form an oscillating circuit in which the frequency is changed depending on the electrostatic capacity C. The principle of the operation of the interface circuit will be briefly described hereinbelow. An output of the operational amplifier OP2 has two levels, that is, H level Voh and L level Vol. For example, if the output at the instant time is H level Voh, a (−) input terminal of the operational amplifier OP1 is negative-fed back by the electrostatic capacity C and imaginary short-circuited with a (+) input terminal at GND potential. Therefore, a constant current Voh/R flows in the (−) input terminal of the operational amplifier OP1 through the resistance R. However, the input impedance of the operational amplifier OP1 is extremely high, and consequently most of the output flows in the electrostatic capacity C to drop an output of the operational amplifier OP2 linearly. At the same time when the voltage at the (+) input terminal of the operational amplifier OP2 which is determined by the divided voltage of the resistances R1 and R2 becomes lower than the GND potential, the output of the operational amplifier OP2 is reversed to Vol, and a constant current Vol/R flows in the electrostatic capacity C in the reverse direction, whereby the output of the operational amplifier OP2 is finally reversed again. FIG. 10 illustrates voltage waveforms at points (1) and (2) of FIG. 9. Such vibrations as shown by the waveforms in FIG. 10 are repeated to continue the oscillation. A frequency f is generally expressed by the following equation (2):

$$f = \frac{1}{C \cdot Z} \quad (2)$$

wherein a circuit constant (determined by the characteristics of the resistances and the amplifiers) is Z and the electrostatic capacity is C. As is seen from formula (2), the frequency f is inversely proportional to the electrostatic capacity C. A rectangular wave signal of the output of the operational amplifier OP2 is level-shifted to a rectangular wave signal concurrent with the operating voltages V+, GND of the microcomputer by a succeeding buffer circuit comprised of a diode D1, resistances R3 and R4 and a transistor Tr1. FIG. 11 shows the oscillation frequency-weight characteristic of the rectangular wave signal. The weight in FIG. 11 indicates the weight of the food placed on the rotary saucer 7. The microcomputer 13 memorizes the relation between the frequency and the weight in the form of a higher order power series approximative formula. For example, supposing that the number of pulses counted by the microcomputer 13 for n seconds is f, and the detected weight is W, the following equation (3) is established:

$$W = K_n \cdot f^n + K_{n-1} \cdot f^{n-1} + \ldots + K_1 \cdot f + K_0 \quad (3)$$

wherein $K_n, K_{n-1}, \ldots, K_1, K_0$ are coefficients of the approximative formula. The weight of the food is approximately calculated by the above formula (3). Although it depends on the efficiency of the microcomputer 13, it may be suitable to calculate the weight approximately by a secondary order or a third order formula.

Figure 12:
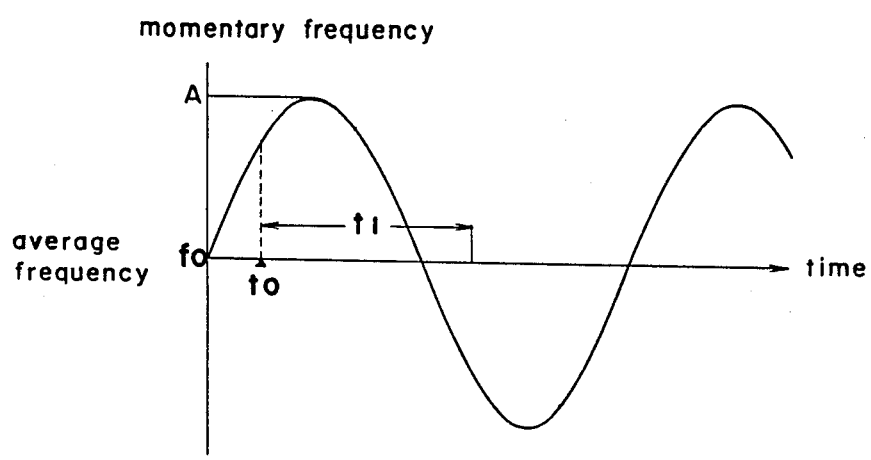
FIG. 12 is a graph showing the principle of effects when the instantaneous weights are integrated to obtain the average.

The principle of the weight detection would be understood from the foregoing description. Still one more problem remains yet to be solved before the weight detecting device is put into practical use, which will be explained with reference to FIG. 8. Although it has been described earlier that the supporting shaft 11 is held movable only in the vertical direction by the bearing portion 29 with the proper clearance maintained between the shaft 11 and the bearing portion 29, actually it is impossible to hold the supporting shaft 11 precisely vertically. If the food is put on the rotary saucer 7, the supporting shaft 11 is inclined in any optional direction, thereby changing the load transmission condition to the load sensor 30 correspondingly. This is a great cause of positional errors. It will be found, for example, from FIG. 14(b) showing the characteristic of the instantaneous weight detecting during rotation of the rotary saucer 7 of the weight detecting device having the construction of FIG. 8 that the instantaneous weight is greatly changed in accordance with the rotation of the saucer 7. Therefore, the weight should be detected when the motor is stopped, resulting in positional errors and inferior measuring accuracy. It is thus required that the weights are detected during one rotation of the saucer 7 or for such a long period of time as corresponding to the time period of one rotation of the saucer 7 which are in turn integrated to obtain the average. The advantages of the integration will be seen from FIG. 12. In this case, for an easy example, a sine wave of the average weight Wo, the oscillation width A, and the angular velocity (rotating speed of the motor) ω during rotation is considered to obtain the average weight W by the integration as follows:

$$W = \frac{1}{t1} \int_{to}^{to+t1} (wo + A \sin \omega t) dt \qquad (4)$$

$$= wo + \frac{A}{t1} \{\cos \omega to - \cos \omega (to + t1)\}$$

wherein the beginning time is to and the integration time period is t1. An error from the true value wo is expressed in the second term of equation (4), which is proportional to the oscillation width A and inversely proportional to the integration time period t1. Accordingly, it is desirable to integrate to obtain the average for a time period closer to the rotating cycle of the motor so as to reduce the errors.

Figure 13:
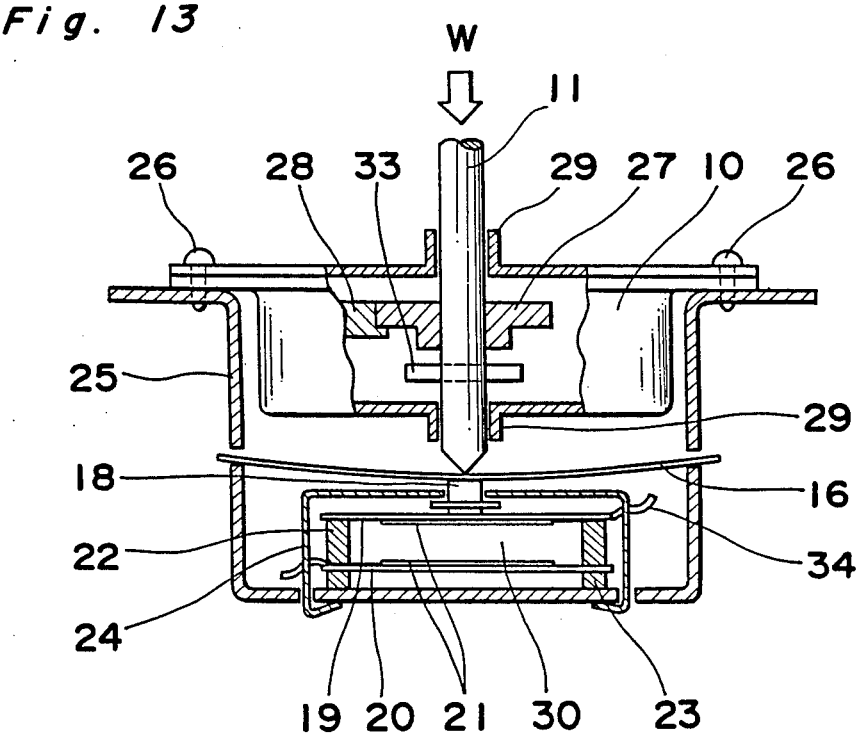
FIG. 13 is a cross sectional view of a modified weight detecting device which is improved in structure so as to reduce the change of the instantaneous weight resulting from the rotation of the platform.

The motor for rotating the saucer in th electronic oven rotates generally at low speeds of 5-6 rpm in many cases, resulting in long integration time period of 10-12 seconds. It is necessary, however, from convenience's sake that the time point when cooking is finished be immediately informed to the user in the case where the earlier-mentioned automatic defrosting is selected as the category of cooking. Therefore, the oscillation width A should be made smaller to shorten the integration time as much as possible in equation (4). In FIG. 13, the construction of a weight detecting device which is improved in structure to reduce the change amount of the instantaneous weight in accordance with the rotation is shown. In the weight detecting device of FIG. 13, the contact area of the supporting shaft 11 with the elastic member 16 is made smaller than the cross sectional area in the central part of the shaft 11, that is, the contact portion of the shaft 11 is sharpened. According to the above-described construction, even when the rotary saucer 7 is rotated consequently to change the inclination degrees of the supporting shaft 11, the contact portion of the shaft 11 with the elastic member 16 is moved within a relatively narrow space, thereby reducing the change of the stress by the elastic member 16. Further, if the contact surface between the load transmission member 18 and the elastic member 16 is formed flat, the load to be transmitted through the elastic member 16 can be transmitted positively in the vertical direction to the electrostatic capacity type load sensor 30, resulting in reduction of the transmission loss. Because of the aforementioned construction, the instantaneous weight during rotation of the motor is changed with remarkably reduced scale. FIG. 14(a) shows the characteristic of the instantaneous weight in the case where the tip of the supporting shaft 11 is sharpened to make the contact area small between the shaft 11 and the elastic member 16, and at the same time, the upper part of the load transmission member 18 is made flat as in the weight detecting device of FIG. 13, while FIG. 14(b) shows the characteristic of the instantaneous weight in the case where the contact portion of the supporting shaft 11 is cut flat and the load transmission member 18 is formed in the conventional cannon ball shape as in the weight detecting device in FIG. 8. Although the food to be measured is 1000 g in both cases, the change of the instantaneous weight is improved to be about 1/7 according to the present invention. Therefore, the above-described integration time period t1 can be shortened, whereby the weight can be detected immediately.

In the manner as described above, the conventional Roberval's mechanism is rendered completely simplified, and simultaneously, errors due to the positional difference of the food on the saucer, can be avoided. With respect to the measuring accuracy, it is possible to measure the weight relatively instantaneously although a little neglectable delay is present in actual use, thus fully responding to such requirements that the detected result be informed to the user promptly in the electronic oven, etc.

The following description refers to the breakage preventing arrangement which will make the weight detecting device of the present invention sturdy and highly reliable. As has been described earlier, the electrostatic capacity type load sensor has considerably strong electrostatic capacity characteristics with respect to the load, and is finely small, and accordingly, the electrostatic capacity type load sensor can be most suitably mounted in a thin weight detecting device. However, since the load sensor is constructed by alumina ceramic, which is very easily broken, the load sensor should be mounted with some protection. In the weight detecting device shown in FIG. 8, for example, the sensor platform 23 is hollow because the lower portion of the sensitive part is bored in order to avoid the application of the load from the side of the substrate 20. In the above construction, if an impact or an overload is added to the weight detecting device, since no cushion or buffer for absorbing the impact is present in such construction, the diaphragm 19 is deflected to an unlimited scale. As a result, not only the diaphragm 19 is contacted with the substrate 20, but the substrate 20 itself is caused to be deflected to be finally broken. According to the present embodiment, the diaphragm 19 and the substrate 20 are made of alumina plate having the thickness of approximately 0.5 mm, the deflection amount leading to the breakage of which is below 100 microns at the maximum, and a structural arrangement is necessary to control the above-described small deflection amount.

Figure 16:
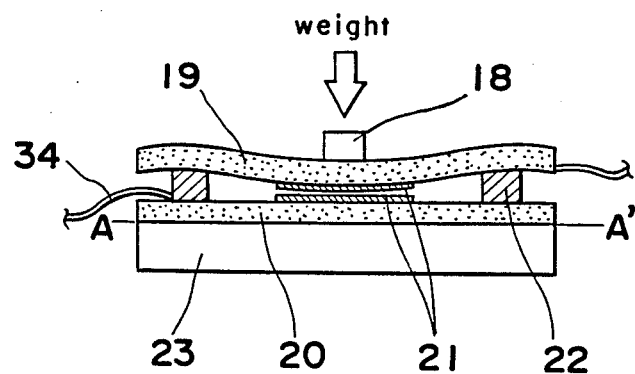
FIG. 16 is a view explaining the principle of how the breakage of the load sensor is prevented when the contact surface of a substrate with the sensor platform is ground.

FIG. 16 is a view showing the structure of one example of a weight detecting device which is provided with a protective mechanism so as to control the small deflection amount referred to above. The A—A' surface of a flat sensor platform 23 is ground, maintaining the strict planeness. Therefore, the sensor platform is scarcely influenced by the load application from the side of the substrate 20. When the load is added in this weight detecting device, the diaphragm 29 is deflected until it is brought into contact with the substrate 20. Thereafter, even when much load is further added, the sturdy sensor platform 23 restricts the deflection of the diaphragm 19, thereby to prevent the destruction of the substrate 20. Although the above-described arrangement can make some improvement, the grinding operation of the AA' surface of the flat sensor platform 23 is necessitated which will require considerable accuracy, and which is therefore disadvantageous from the fact that the number of operation is increased, with higher manufacturing cost. Moreover, since the substrate 20 is curved or warped in the manufacturing process or foreign matters may be adhered onto the ground surface of the sensor platform, it is impossible to completely avoid the application of pressure from the side of the substrate 20.

Figure 15:
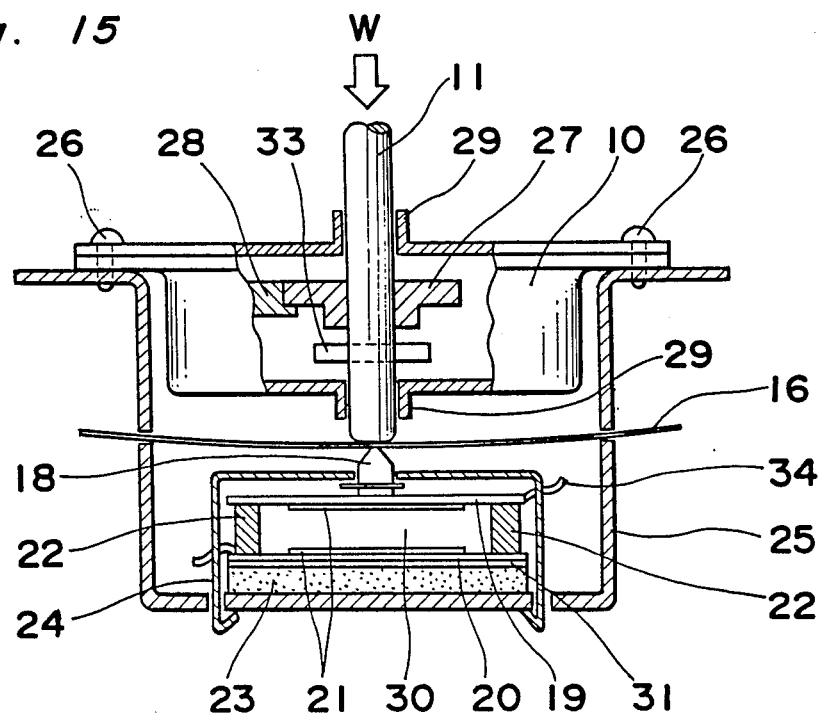
FIG. 15 is a cross ectional view of a weight detecting device mounted with a thin film spacer for prevention of the breakage of the load sensor.

In the weight detecting device of FIG. 15, a thin-film spacer 31 is inserted below the sensitive part of the substrate 20 so as to prevent the breakage of the load sensor. A generally-sold aluminum foil has a stable thickness, approximately 15 microns. Therefore, is this aluminum foil referred to above is employed as the thin film spacer 31, a very small gap, in the thickness of about 15 microns, can be secured precisely below the sensitive part of the substrate 20. This will be effective for prevention of the breakage of the load sensor similarly as in the case where the deflection amount of the diaphragm is restricted.

Figure 17:
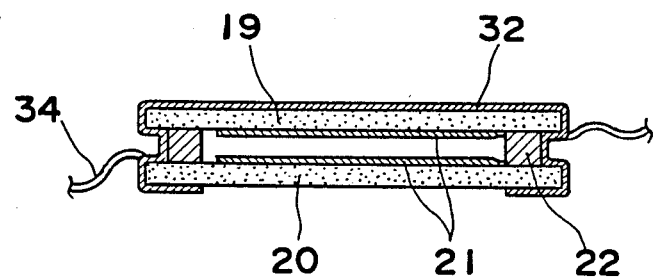
FIG. 17 is a view explaining the principle how the breakage of the load sensor is prevented when water repellant coating is coated on the surface of the electrostatic capacity type load sensor.

FIG. 17 displays a further arrangement of a protective mechanism for prevention of the breakage of the load sensor wherein a small gap is formed below the sensitive part of the substrate 20.

According to the arrangement of FIG. 14, the water repellant coating 32, which is disclosed in WO 87/04786 (SAKAMOTO et al.), is positively utilized. The coating 32 is polyimide amidic resin, silicon resin or fluorize resin, is coated on the surface of the load sensor, thereby avoiding influences of the leak current due to the dew drops, dusts, or the like produced on the surface of the load sensor, and therefore the water repellant coating is considerably useful to secure the efficiency of the sensor. As shown in FIG. 17, the water repellant coating 32 coats except at the pressure sensitive part of the substrate 20, so that a gap of the water repellant coating approximately 10 microns in thickness can be secured below the sensitive part of the substrate 20. Accordingly, it is able not only to avoid the influences of the leak current, but to protect the load sensor by the small gap below the sensitive part of the substrate. In order to control the coating thickness of the water repellant coating 32, unformity is required in the coating operation conditions, namely, in the coating manner of the coating material or in the spraying condition of the coating material, etc.

Figure 18:
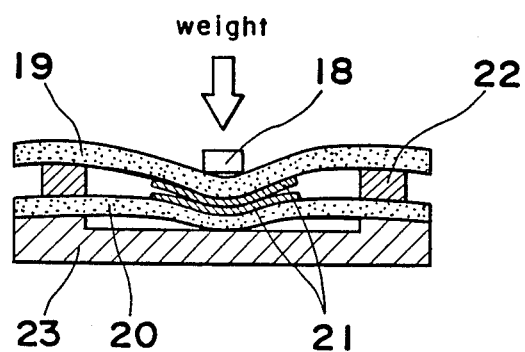
FIG. 18 is a view explaining the principle how the breakage of the sensor is prevented when a very small gap is formed in the sensor platform by etching.

It will be understood from the above description that it is extremely difficult to form the small gap below the sensitive part of the substrate 20 with high precision. FIG. 18 illustrates the structure of a sensor protecting mechanism subjected to etching to secure the small gap precisely. The metallic sensor platform 23 is corroded through etching by the depth of about 10 microns below the sensitive part of the substrate 20, thereby forming a small gap. The corrosion depth of etching can be adjusted to the accuracy of 1 micron if the density and temperature of the etching solution, and the time period during which the object to be corroded is left in the etching solution, are controlled. Therefore the etching method is superior in that the depth is rarely irregular and good productivity is secured.

Figure 19:
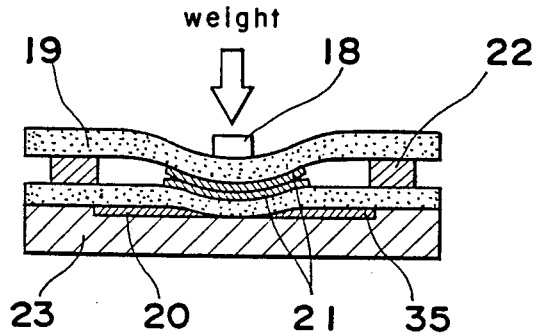
FIG. 19 is a view explaining the principle how the breakage of the load sensor is prevented when the very small gap of FIG. 18 is filled with silicon rubber filling agent.

Further, as shown in FIG. 19, more effects can be achieved when liquid silicon rubber is filled into the small gap formed in the above-described various methods. The liquid silicon rubber is able to spread into the gap without adding unnecessary stress to the sensitive part, producing the sealed condition. The silicon rubber, after being hardened, is stable in the temperature range of −50° to 200° C. as the elastic material, so that extraordinary deflection of the diaphragm 19 can be limited, and at the same time impacts can be absorbed, thus improving reliability of the protective function of the arrangement.

The weight detecting device according to the present invention is applicable to a heating and cooking apparatus, like an electronic oven, provided with a rotary saucer. Moreover, the present invention is not restricted to the heating and cooling apparatus, but it is needless to say that the present invention is also applicable to a weight detecting device which can measure the weight of an object while rotating the object.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A weight detecting device, comprising:
   a plate for receiving an object to be measured;
   a rotatable shaft supporting said plate and movable a predetermined amount along a thrust axis of said rotatable shaft;
   a leaf spring receiving and supporting a lower end of said rotatable shaft, said leaf spring movable in the direction of said thrust axis of said rotatable shaft at the point on said leaf spring supporting said lower end of said rotatable shaft, said leaf spring having opposite ends;
   a support means for horizontally supporting said opposite ends of said leaf spring;
   a load detecting means disposed below said leaf spring for detecting a composite load of said object on said plate, via said rotatable shaft and said leaft spring, and the stress on said leaf spring, and for outputting an electrical signal corresponding to said composite load; and
   a weight detecting circuit for detecting the weight of said object from said electrical signal of said load detecting means.

2. The weight detecting device as set forth in claim 1, wherein:
   said lower end of said rotatable shaft contacts said leaf spring on one side of said leaf spring at a contact area approximately midway between said opposite ends of said leaf spring; and
   said load detecting means contacts said leaft spring at said contact area approximately midway between said opposite ends of said leaf spring on the opposite side of said leaf spring.

3. The weight detecting device as set forth in claim 2, wherein:
   said load detecting means comprises a substrate made of sintered alumina, a diaphragm made of sintered alumina disposed opposite to and a predetermined distance from said substrate, a capacitive electrode on each of the opposite surfaces of said substrate and said diaphragm, and a load transmission member on the surface of said diaphragm opposite said capacitive electrode for transmitting said composite load to said diaphragm.

4. The weight detecting device as set forth in claim 3, wherein:
   said contact area between said lower end of said rotatable shaft and said leaf spring has a smaller area than a central cross-sectional area of said rotatable shaft, said rotatable shaft being sharpened at said lower end.

5. The weight detecting device as set forth in claim 3, wherein:
   said load transmission member has a flat surface in contact with said leaf spring.

6. The weight detecting device as set forth in claim 3, wherein:
   a sensor platform in the shape of a flat plate receives said load detecting means thereon, said sensor platform having an upper surface ground plane supporting the lower surface of said substrate.

7. The weight detecting device as set forth in claim 3, and further comprising:
   a sensor platform receiving said load detecting means thereon; and
   a thin film spacer disposed on an upper surface of said sensor platform, said thin film spacer spacing said substrate of said load detecting means from said sensor platform, and said thin film spacer having a vacant portion defining a space between said substrate and said sensor platform.

8. The weight detecting device as set forth in claim 3, and further comprising:
   a sensor platform in the shape of a flat plate receiving said substrate of said load detecting means thereon, said load detecting means further comprising a spacer member spacing said diaphragm from said substrate said predetermined distance, said spacer member defining a sensitive portion of said diaphragm and said substrate whereat said electrodes are disposed, wherein outside surfaces of said diaphragm, spacer member, and substrate, except for said sensitive portion of said substrate, are coated with a water repellant material, said outside surface sensitive portion of said substrate thus defining a space between said substrate and said sensor platform.

9. The weight detecting device as set forth in claim 3, and further comprising:
   a sensor platform receiving said substrate of said load detecting means thereof, said sensor platform having an etched portion defining a space opposite said substrate.

10. The weight detecting device as set forth in claims 7, 8, or 9, wherein:
    said space is filled with silicon rubber to seal said space.

11. The weight detecting device as set forth in claim 1, wherein:
    said support means comprises a pair of fulcrum supports supporting said opposite ends of said leaf spring.

12. The weight detecting device as set forth in claim 1, wherein:
    said lower end of said rotatable shaft is in direct contact with said leaf spring.

* * * * *